United States Patent [19]

Avargues et al.

[11] Patent Number: 5,530,692
[45] Date of Patent: Jun. 25, 1996

[54] METHOD AND APPARATUS FOR INITIALIZING ISDN ADAPTER CARDS IN A WORKSTATION OPERATING AS AN ISDN PRIMARY GATEWAY

[75] Inventors: Didier Avargues, Cagnes-Sur-Mer; Jean-Louis Clara, La Colle-Sur-Loup; Jean-Francois Le Pennec, Nice; Patrick Michel, La Gaude; Patrick Sicsic, La Colle-Sur-Loup, all of France

[73] Assignee: International Business Machines Corporation, Armonk, N.Y.

[21] Appl. No.: 151,601

[22] Filed: Nov. 12, 1993

[30] Foreign Application Priority Data

Dec. 17, 1992 [EP] European Pat. Off. ............... 92480195

[51] Int. Cl.⁶ .................................................... H04L 5/22
[52] U.S. Cl. ........................ 370/15; 370/85.1; 370/110.1; 340/825.08; 371/53
[58] Field of Search .................................. 370/85.1, 94.1, 370/15, 110.1, 85.8, 85.9, 85.11, 95.2; 340/825.08; 371/53

[56] References Cited

U.S. PATENT DOCUMENTS

| | | | |
|---|---|---|---|
| 4,688,209 | 8/1987 | Banzi, Jr. et al. | 370/15 |
| 4,750,136 | 6/1988 | Arpin et al. | 340/825.08 |
| 4,866,703 | 9/1989 | Black et al. | 370/60 |
| 5,014,269 | 5/1991 | Picandet | 370/85.11 |
| 5,048,012 | 9/1991 | Gulick et al. | 370/77 |
| 5,051,992 | 9/1991 | Taniguchi et al. | 370/110.1 |
| 5,058,110 | 10/1991 | Beach et al. | 370/85.6 |

FOREIGN PATENT DOCUMENTS

| | | | |
|---|---|---|---|
| 0036172 | 3/1981 | European Pat. Off. | G06F 9/40 |
| 0375981 | 11/1989 | European Pat. Off. | G06F 13/22 |
| 0515760 | 5/1991 | European Pat. Off. | G06F 15/16 |

OTHER PUBLICATIONS

IEEE International Conference on Communications '87, vol. 3, 10 Jun. 1987, Seattle, US pp. 1356–1360 Kuzyszyn and Park "ISDN Protocol and Service Verification and Performance Testing" pp. 1357–1359: Sec. 3 ISDN Network Test Sys.

*Primary Examiner*—Douglas W. Olms
*Assistant Examiner*—Russell W. Blum
*Attorney, Agent, or Firm*—John J. Timar; John B. Frisone

[57] ABSTRACT

A method for initializing ISDN adapter cards installed within a workstation having a main processor and an ISDN primary adapter for connecting the ISDN adapter cards to an ISDN primary gateway. Each ISDN adapter card has circuits for handling at least one B-channel, and a first processor associated with memory storage. The ISDN primary adapter includes a second processor associated with a second memory storage. In response to the reception of a specific polling pattern transmitted to each adapter card by the primary adapter, a pattern is transmitted to the workstation processor for requesting the loading of the second memory storage with operational code transferred from the workstation to the ISDN adapter card. The ISDN primary adapter, in response to the request pattern received by the main processor, transmits a second pattern via the ISDN adapter card that transmitted the first pattern, so that the main processor in the workstation and the processor in the ISDN primary adapter recognize the ISDN adapter card that transmitted the patterns to the workstation and to the ISDN primary adapter as the master ISDN adapter card for transmission of control information on the D-channel.

11 Claims, 9 Drawing Sheets

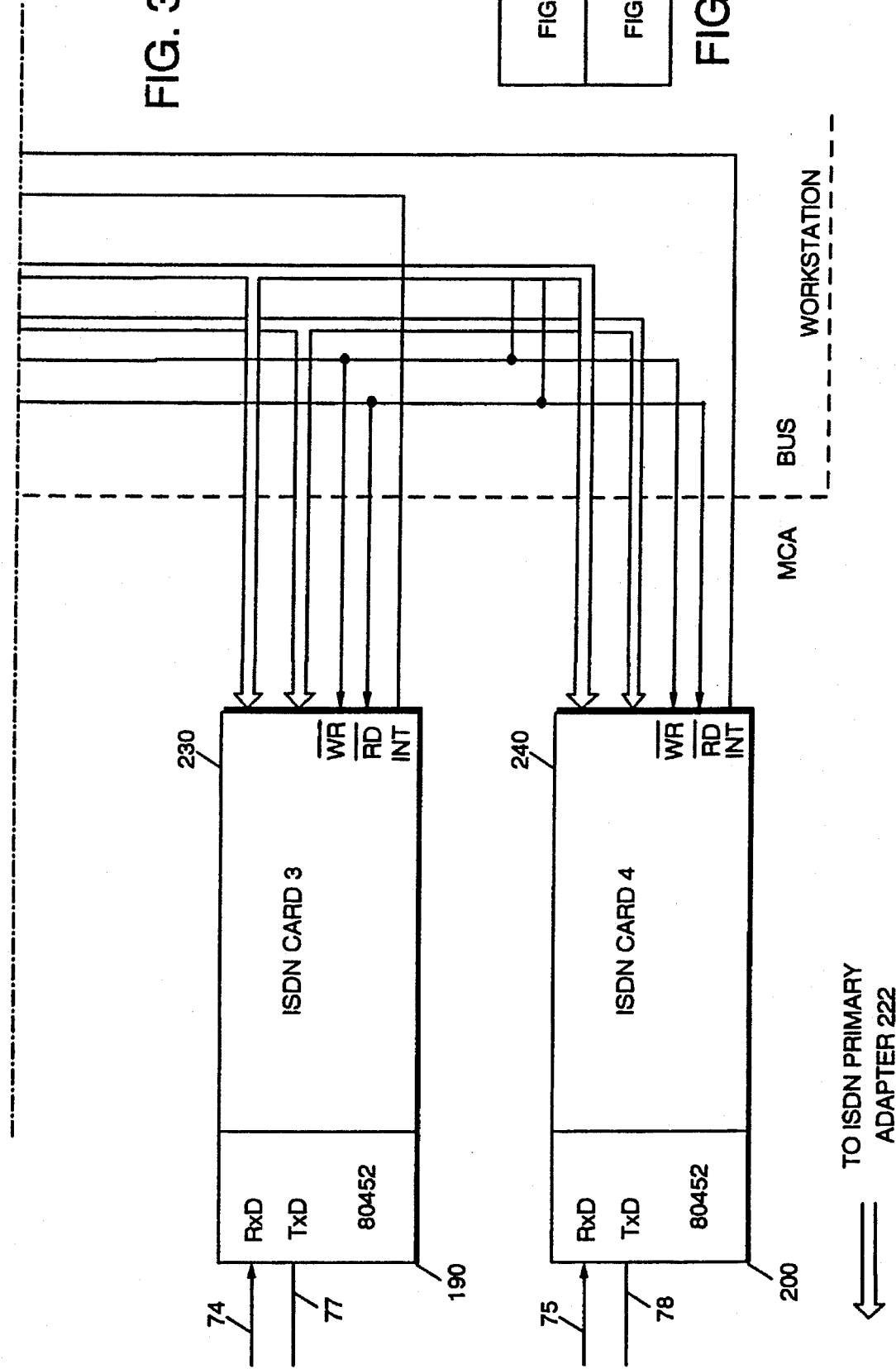

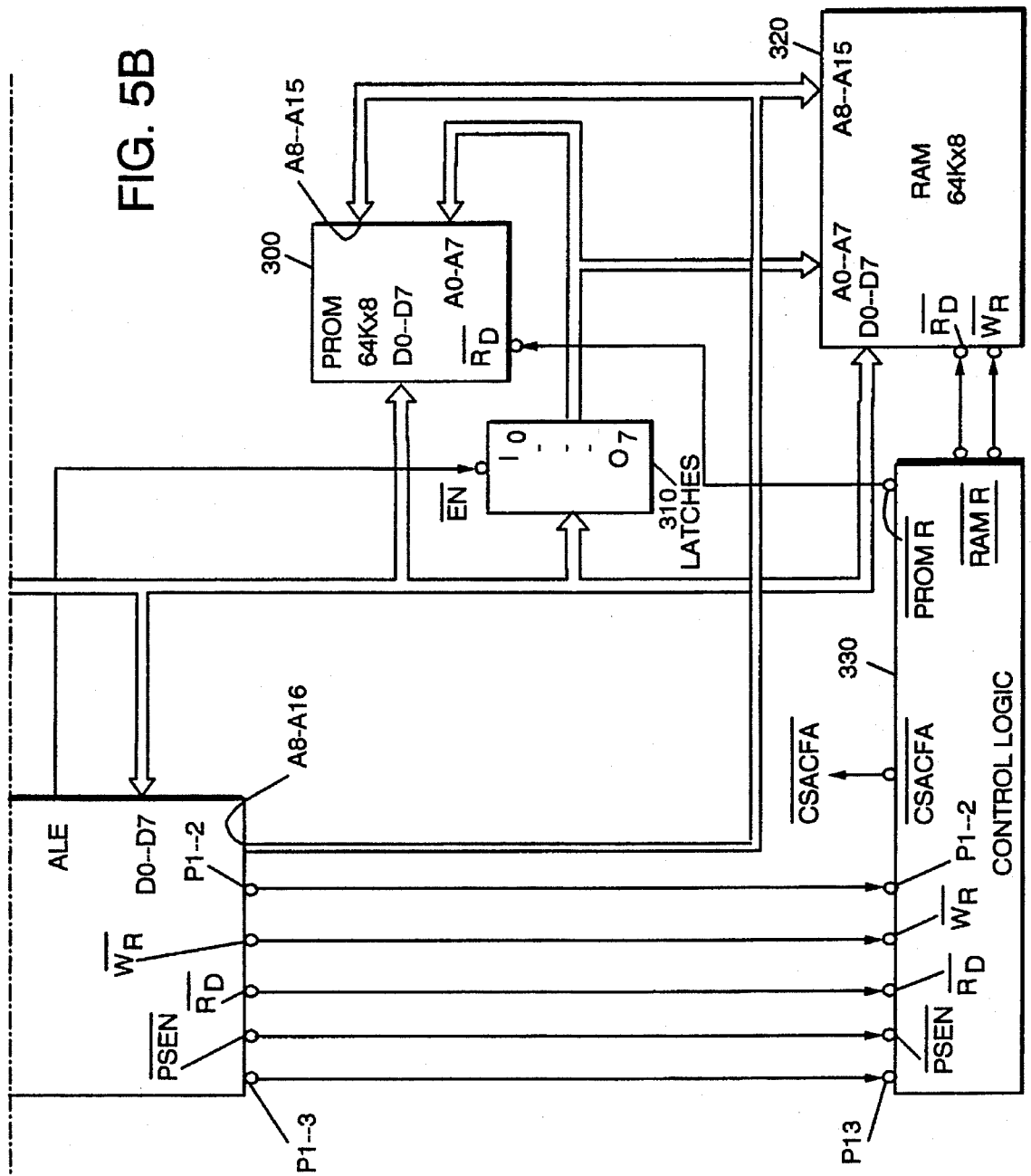

METHOD AND APPARATUS FOR INITIALIZING ISDN ADAPTER CARDS IN A WORKSTATION OPERATING AS AN ISDN PRIMARY GATEWAY

TECHNICAL FIELD OF THE INVENTION

The invention relates generally to the telecommunication field and more particularly to a method for initializing a set of ISDN adapter cards installed in a workstation operating as an ISDN primary gateway.

BACKGROUND ART

Integrated Services Digital Network (ISDN) is an international communications standard that makes it possible to deliver multiple services in addition to the normal telephone (voice) service. With it, fax, video, data and all kinds of images can be transmitted to a terminal over a single line. The ISDN is provided by public network operators at both national and international levels. These carriers offer a choice of basic or primary rate access to the ISDN network. The basic access (also called 2B+D) provides two, 64 Kbps B channels for voice or data communications, plus one D channel for the controlling and the monitoring of the transmission, giving an aggregate speed of 144 Kbps. The primary rate (which is called 30B+D) offers up to 30 simultaneous, 64 Kbps B channels and one 64 Kbps D channel for an aggregate speed of 2 Mbps.

The performance offered by ISDN networks, and particularly the speed provided by the primary rate, has allowed the possibility of effective national and international communications between host computers, either IBM or non-IBM, running X25, SNA, TCP/IP or OSI applications, and a wide range of terminal equipments and users. Thus, a wide range of users, who are generally not specialists in the telecomunication field and in the structure and operation of the sophisticated telecommunication equipment involved, benefit from the high transmission rates and possibilities of the ISDN equipment.

For instance, the possibilities offered by the ISDN networks have allowed the creation and the development of electronic catalogs and multimedia databases. Electronic images which are stored on a central database can thus be accessed in a few seconds by multiple users within a country or across borders. Electronic and up-to-date catalogs allow travel agents, for example, to show specific resorts and hotels with much more detail than obtained by merely using a printed catalog. The tour operators can also benefit from these possibilities since the update of one single central database appears easier and cheaper. Also distributors and retailers can demonstrate products clearly, whether the items are cars, fashion or technical products, and let users browse through catalogs and place orders directly. Retailers can show a wide variety of models electronically without having to keep the whole expensive range on hand, and additions and deletions are easily handled. The ISDN network allows a set of up to 30 users to be connected simultaneously to one electronic catalog.

Furthermore, the possibilities which are offered by the ISDN networks also allow the development of file transfers where software can be downloaded or retrieved from a central host by remote branch office or distribution centers to take advantage of lower tariffs during non-peak hours.

As a conclusion, a wide number of different telecommunication users are allowed to benefit from the possibilities which are offered by the ISDN primary communications, including data, voice, and image transfers by means of a corresponding wide number of telecommunication applications.

Generally speaking, operators are aware of the numerous possibilities which are provided by use of the personal computers or workstations. Since workstations are becoming more and more "user-friendly", and include keyboard, mouse, icons and prompt messages displayed on the screen, the operator is accustomed to controlling a highly sophisticated computer. However, workstations, as such, are not adapted to the telecommunication field and particularly the ISDN primary communications which involve serious constraints.

As mentioned above, since the use of ISDN telecommunication primary services are likely to be used by a wide range of operators having different skills (such as in travel agency, real estate agency, retailing and distribution applications), a need has appeared to have an ISDN primary gateway based on a "user-friendly" workstation so that any operator, regardless of his personal skill and experience in the telecommunication field, can be provided with a simple and efficient apparatus allowing customization, configuration, line connection, error and directory management and data traffic control.

Workstations based on personal computers have achieved wide acceptance because they provide the user with high data processing resources while ensuring ease of use.

OBJECTS OF THE INVENTION

The problem to be solved by the present invention is to provide an ISDN primary gateway which is based on a workstation such as a personal computer so that the operator is provided with a sophisticated telecommunication apparatus with the facilities such as the mouse, icons, and windows displayed on the screen for controlling the apparatus.

BRIEF SUMMARY OF THE INVENTION

This problem is solved by the method and apparatus according to the present invention which comprises a workstation in which a set of ISDN adapter cards and X.25 cards are installed, the ISDN cards being connected to an ISDN primary adapter, while the X.25 adapter cards provide the X.25 links with host computers. According to the present invention, the numerous ISDN and X.25 cards cooperate with the processor of the workstation by means of a specific procedure which assures that one of the ISDN adapter cards controls the management of the D-channel while the other adapter cards will control only B-Channels.

The cards and the workstation cooperate together in order to provide the handling of ISDN primary frames consisting of 30B-channels and one D-channel. The cooperation between the cards and workstation is achieved by means of the method according to the present invention which comprises the steps of:

performing a polling in the ISDN primary adapter which includes the transmission of a specific polling pattern to each of the ISDN adapter cards, and, in response to the reception of the polling pattern in one of the ISDN adapter cards, transmitting a first pattern to the main processor located in the workstation to request the loading of the second memory storage with operational code transferred from the workstation to the ISDN adapter card and the ISDN primary adapter, and in response to the request pattern received by the main processor, transmitting a second pattern to the ISDN primary adapter via the ISDN adapter card that transmitted the first pattern, so that the main processor in the workstation and the processor in the ISDN primary adapter recognize the ISDN adapter card that has, respectively, transmitted the first and third pattern to the workstation and to the ISDN primary adapter, as the master ISDN adapter card which will be used for the transmission of the control information for the D-channel. Additionally, that master ISDN adapter card is used for the downloading of the operational code from the workstation to memory storage located in the ISDN primary adapter.

This results in the possibility of loading different required software routines in appropriate locations within the cards so that all cards work together in order to handle the 30B+D channels of the ISDN primary frame.

DESCRIPTION OF THE PREFERRED EMBODIMENT OF THE INVENTION

Figure 1:
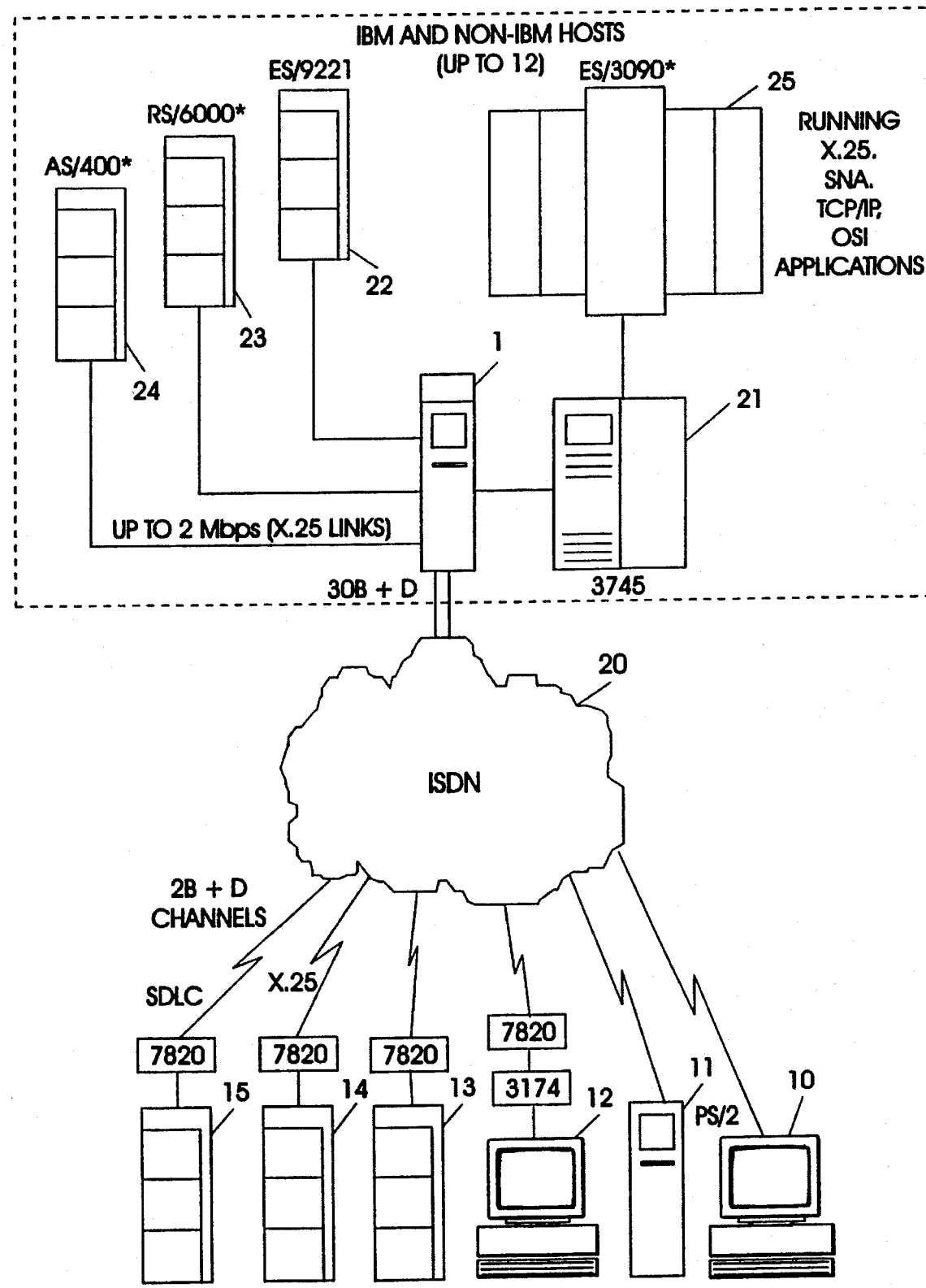
FIG. 1 illustrates the general environment of an ISDN primary gateway using the method according to the present invention.

With respect to the FIG. 1, there is shown the general technical environment of one ISDN primary gateway equipment 1 which can advantageously incorporate the different technical steps of the method according to the present invention. ISDN primary gateway equipment 1 allows connection of different Data Terminating Equipment (DTE), such as a terminal 10, interactive terminal 11, or a terminal 12 connected to a cluster controller of the type IBM 3174 via an ISDN terminal adapter of the type IBM 7820, and also data processing systems 13, 14 and 15 of the type IBM RISC System/6000, all of which systems 13–15 are connected to the ISDN network 20 through their associated IBM 7820 terminal adapter, for instance.

In one embodiment of the invention, each DTE 10 to 15 can be located in a different town. For instance, DTE 15 can be located in Paris while DTE 14 operates in London and DTE 13 in Munich. Each is provided a 2B+D basic access to its respective national ISDN network in order to access an electronic database placed on a host computer 25. The host 25 may be of the type IBM 3090, also located in Paris and accessed via a telecommunication controller equipment 21 such as an IBM 3745. Such a telecommunication architecture could be particularly useful in the real estate field where up to 30 different remote DTEs, each one being located in a corresponding real estate agency, can gain access to a centralized database of the houses for sale in Europe and containing a wide and comprehensive description, including data, images and possibly music or voice, from the database located within host computer 25 in Paris. It should be noticed that the architecture is not limited to one single host computer 25. The ISDN primary gateway 1 could also provide access to additional host computers, such as an IBM ES/9221 host 22, a RISC System/6000 host 23 and an AS/400 computer 24.

Figure 2:
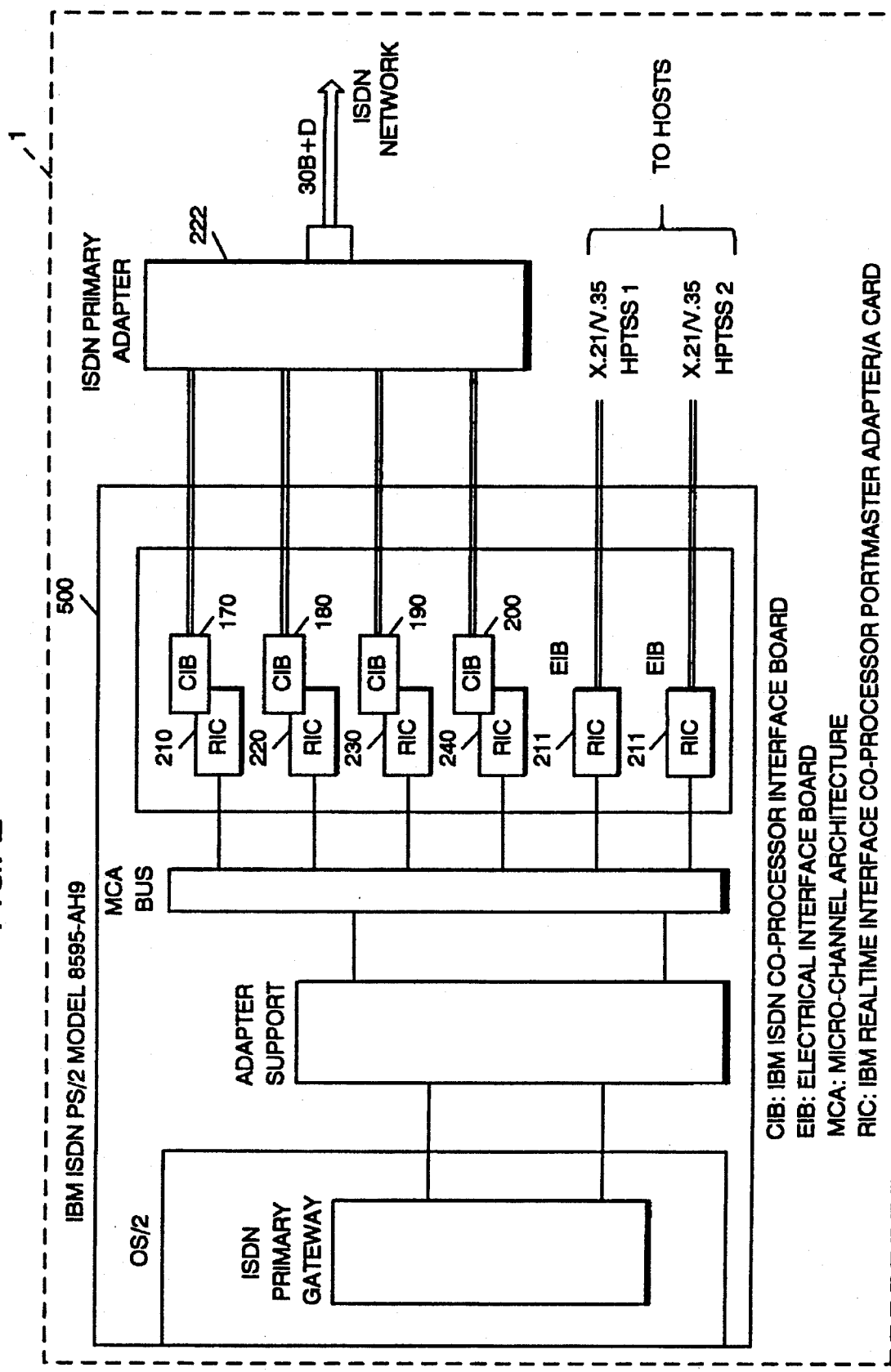
FIG. 2 details the technical architecture of the ISDN primary gateway which is based on a personal workstation equipped with adapter cards.

With respect to FIG. 2, there is described the general architecture of the ISDN primary gateway which uses the method according to the present invention. Gateway 1 comprises a computer 500, which is of the type such as the IBM Personal System/2 8595 - AH9 and follow-on models in the preferred embodiment of the invention, and in which is installed one or two X.25 cards 211 for allowing the X.21/V.35 or HPTSS connections to the host computers. It additionally comprises one to four ISDN cards 210, 220, 230 and 240 which allow the connection of the computer to a ISDN primary adapter 222. Each of the X.25 cards 211 or ISDN cards 210–240 is currently available under the reference "IBM Real Time Interface Coprocessor Portmaster Adapter/A" card (RIC) which is marketed by IBM and is well known to those skilled in the art. Briefly, each RIC Portmaster card 211 or 210–240 comprises its own microprocessor operating with some memory and a Direct Memory access (DMA) controller, I/O devices, etc. That microprocessor is associated with an operating system providing time sharing and priority management. Each RIC Portmaster card is directly connected to the Micro-channel Architecture (MCA) bus of the workstation 500, by which resources are therefore available to all the cards which are installed in the machine. It should be noticed that in the preferred embodiment of the invention, each RIC Portmaster card 211 is a mother board, on which is installed in an additional corresponding daughter card (not shown in the figure) of the type Electrical Interface Board providing the electrical interface, either conforming with the X.21 or V.35 CCITT Recommendations. That is to say, these additional cards provide the well known functions corresponding to layer 1 of the OSI model. Assuming that one host computer to which the ISDN primary gateway 1 is intended to be connected has a V.35 interface, the corresponding RIC Portmaster card 211 will be fitted with a V.35 daughter board card. In the reverse case, i.e., the case of a host computer communicating through an X.21 interface, the RIC Portmaster card will be fitted with a daughter card matching the CCITT X.21 recommendations. Similarly, each ISDN RIC Portmaster card 210–240 is fitted with a corresponding ISDN daughter card 170, 180, 190 or 200, referred to as a Coprocessor Interface Board (CIB), which allows electrical connection to an ISDN primary adapter 222 achieving the time division multiplexing (TDM) of the 30 B channels, thus enabling the ISDN primary gateway to provide primary access to the ISDN network.

Figure 3A:
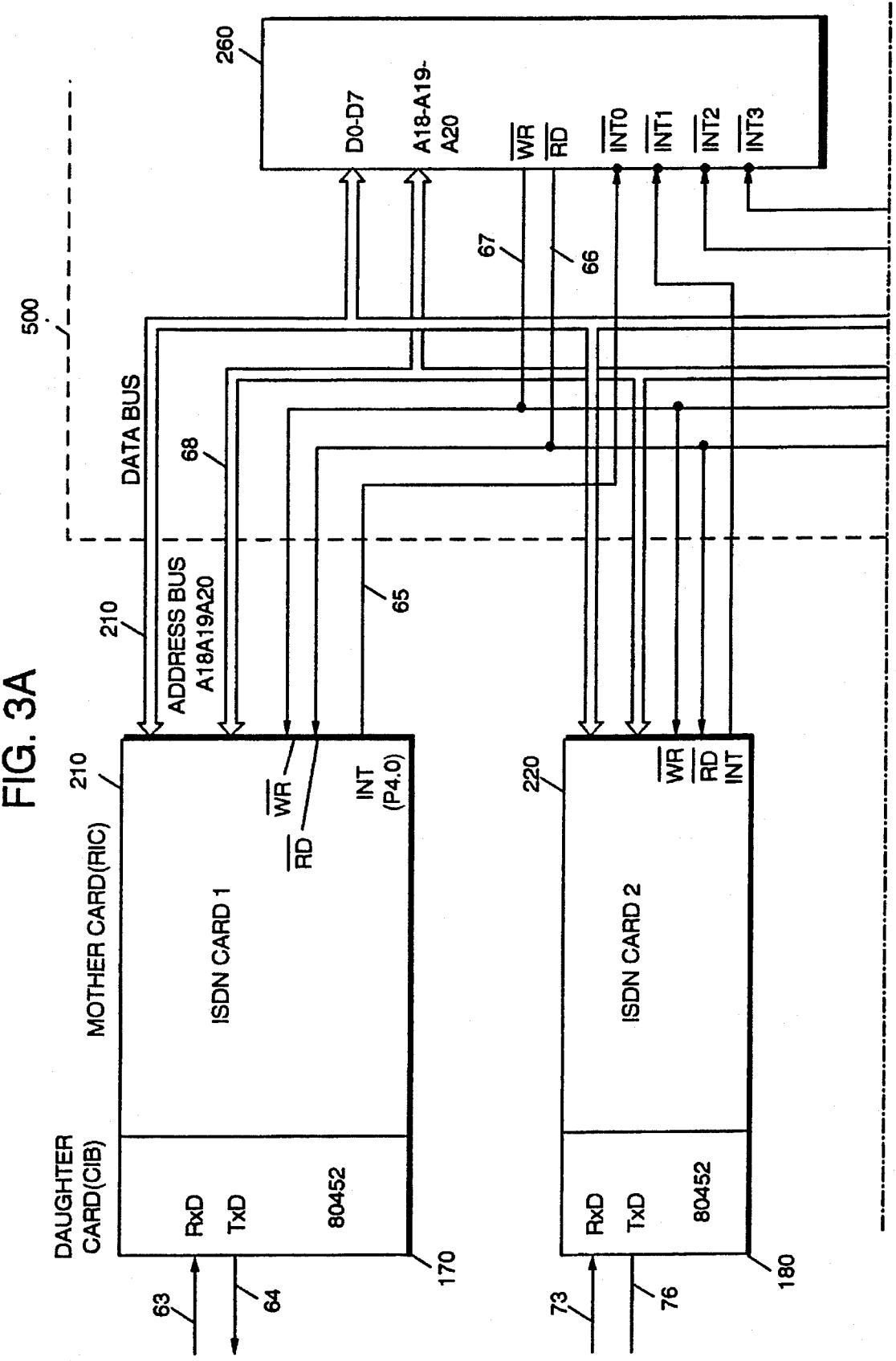
FIG. 3 is a view of the structure of the workstation 500 and the four ISDN adapter cards 210, 220, 230 and 240.

With respect to FIG. 3, there is shown the structure of the workstation having its possibly four ISDN adapter RIC cards 210–240, each card being a mother card associated with a daughter CIB card 170, 180, 190 or 200 as mentioned above. Each ISDN card provides the handling of up to 8 B-channels, or 7 B-channels plus the D-channel, which are multiplexed by means of the ISDN primary adapter 222. The structure of ISDN primary adapter 222 is illustrated in FIG. 5.

Figure 5A:
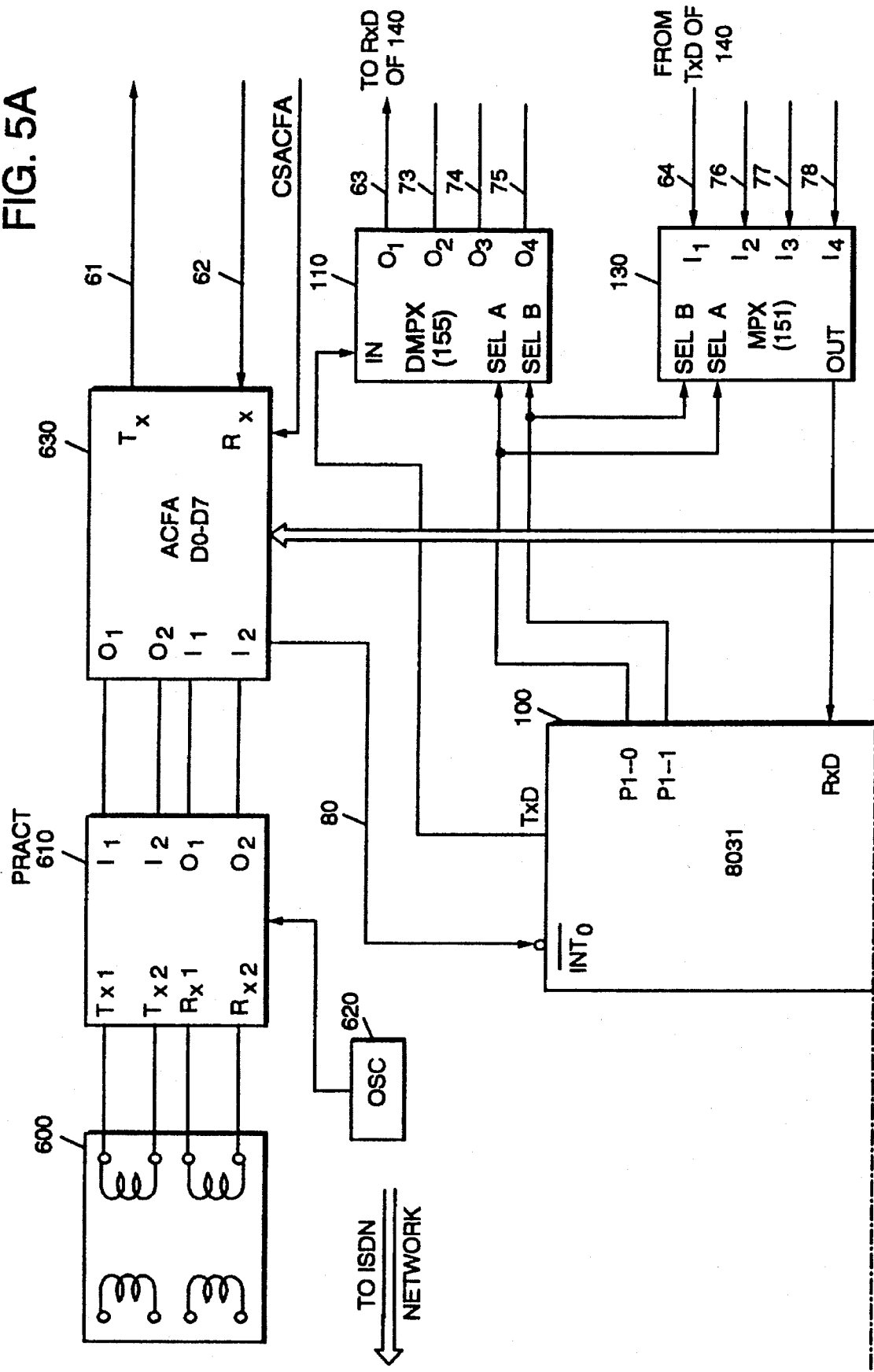
FIG. 5 is a view of the internal structure of the coupler of the ISDN primary adapter 222.

With respect to FIG. 5, the coupler part of ISDN primary adapter 222 comprises a set of two line-transformers 600 which provide the electrical connection to the primary Network Terminator (NT) of the ISDN network. Line-transformers 600 are, respectively, connected to the transmit balanced lines Tx1 and Tx2 and receive balanced lines Rx1 and Rx2 of a Primary Rate Adapter and Clock Transmitter (PRACT) module 610, the latter being driven by an oscillator circuit 620. PRACT module 610 is a well known module which is marketed by SIEMENS under the reference PEB 2235 and will not be detailed further. PRACT module 610 also communicates with an Advanced CMOS Frame Aligner (ACFA) module 630 by means of a set of four balanced transmit and receive wires O1/O2 and I1/I2 carrying the HDB3 transmit and receive signal. The ACFA module provides the management, including network management functions, of the channel 0 which is used for the reporting of incidents. On the occurrence of such incidents, ACFA module 630 generates an interrupt signal on a lead 80 which is transmitted to a microprocessor 100 contained in the coupler of ISDN primary adapter 222. ACFA module 630 transmits and receives TDM data to and from a set of four internal HSCX modules which are located inside the RIC Portmaster card by means of two receive Rx and transmit Tx leads 62 and 61 as described below. In addition to the above circuits and modules contained in the coupler of the ISDN primary adapter 222, whose main purpose is to handle the ISDN data traffic, the ISDN primary adapter 222 further comprises a set of circuits which are not part of the invention and which provides the following:

74138: address decoder

34C85: V.11 receiver

34C87: V.11 drivers power supply switcher - LED drivers

Processor 100, of the type INTEL 8031, is associated with a PROM storage 300, and communicates by means of an address/data bus which is demultiplexed by latches 310. Processor 100 is also associated with a RAM storage 320 which is particularly used for storing the operational code which is downloaded from the Personal System/2 main storage through one RIC Portmaster card as will be described below. A multiplexing circuit 130 (and a demultiplexing circuit 110 are used for multiplexing and demultiplexing, respectively, the exchange of serial control data between processor 100 of the coupler of the ISDN primary adapter and the four distinctive CIB daughter cards 170, 180, 190 and 200. All the control logic signals which are needed, particularly including the ACFA Chip Select (CSACFA), RAM WR, RAM RD, PROM RD control signals are provided by a CONTROL LOGIC circuit 330.

Figure 4:
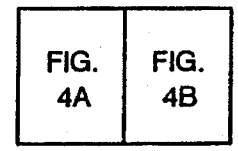
FIG. 4 illustrates the internal structure of each ISDN adapter card 210–240.
Figure 4B:
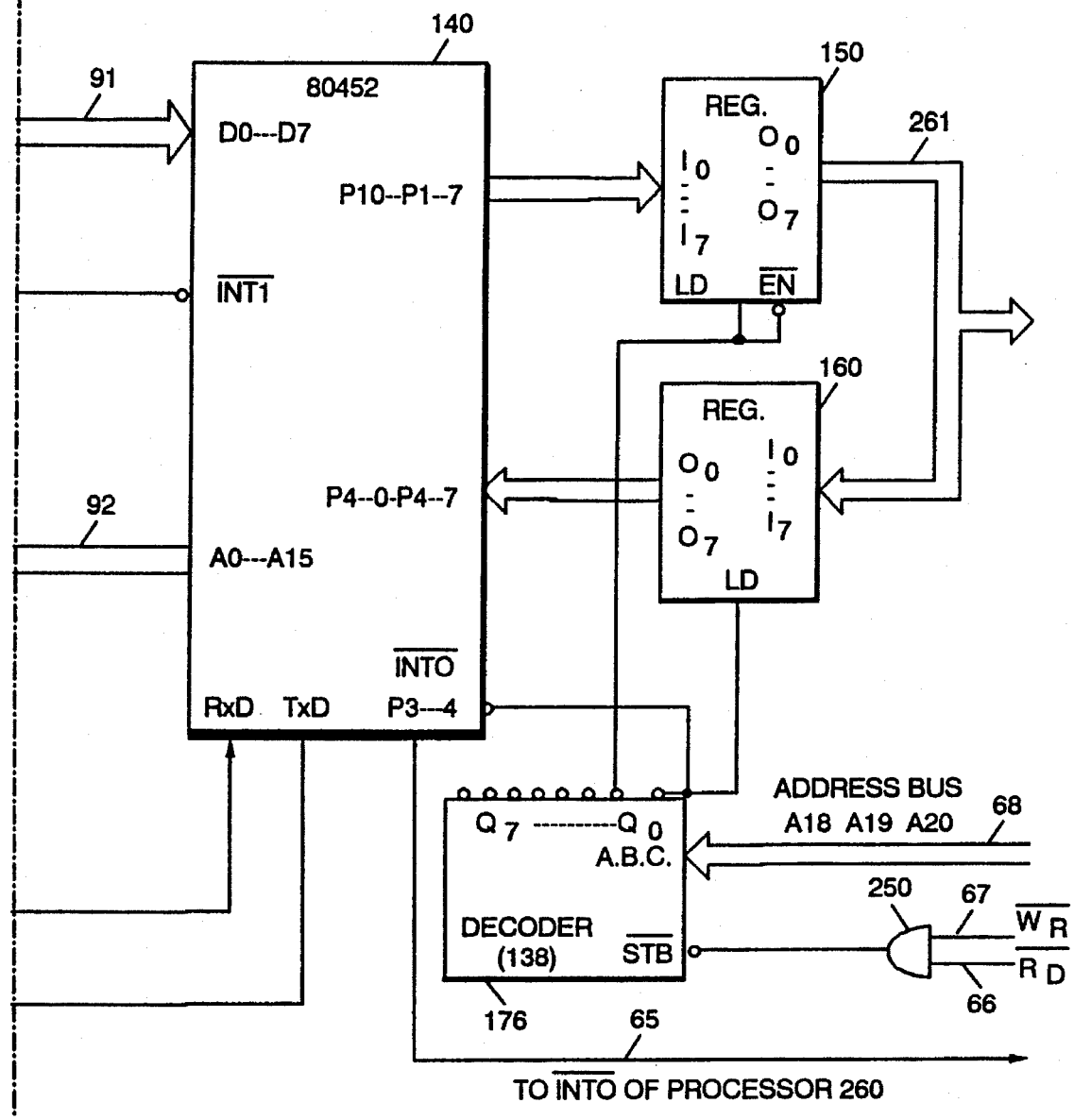
Figure 4A:
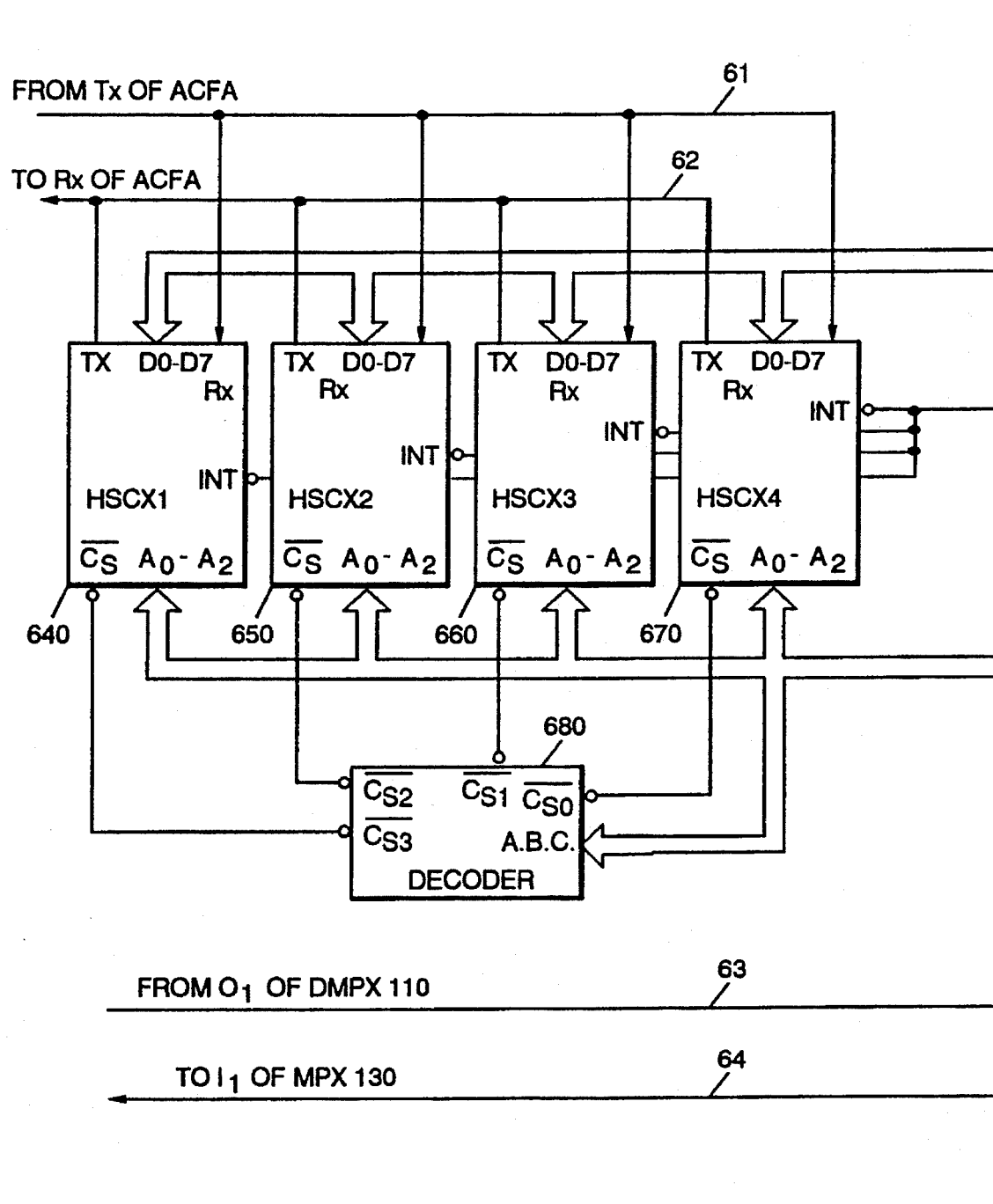

As already mentioned, each RIC Portmaster card 210, 220, 230 or 240 is fitted with a CIB daughter card 170, 180, 180, 200 and a mother card which is installed in the Personal System/2 computer. The internal structure of each RIC card 210–240 with its associated daughter card 170–200 is illustrated in FIG. 4.

Each card 210–240 comprises a set of four different modules, HSCX1 to HSCX4, referenced by numerals 640, 650, 660 and 670 which provide the TDM slot management for the multiplexed data traffic, each HSCX module providing the management of two full-duplex communication channels. Therefore, the four modules provide the management of 8 full-duplex channels in order to constitute unique TDM data traffic which is to be transmitted and received from the ACFA module 630 located in the coupler of the ISDN primary adapter 222.

The HSCX modules communicate with a microprocessor 140, of the type INTEL 80452, by means of an 8 bit data bus 91 carrying the data flow of the 8 full duplex channels. An A0–A15 address bus 92 is decoded by a decoder 680 for controlling the internal registers of the HSCX modules 640, 650, 660 and 670. A set of two registers 150 and 160 are used for the communication between main computer 260 and the microprocessor 140 through the Micro Channel Architecture (MCA) bus 261. The access to the latter registers is controlled by a decoder 176 receiving the address carried by the address bus 68 of the MCA bus 261.

Having described the main components of the different cards of the ISDN primary gateway, there will now be described how all cards cooperate in order to provide the handling of one ISDN primary frame.

Figure 6:
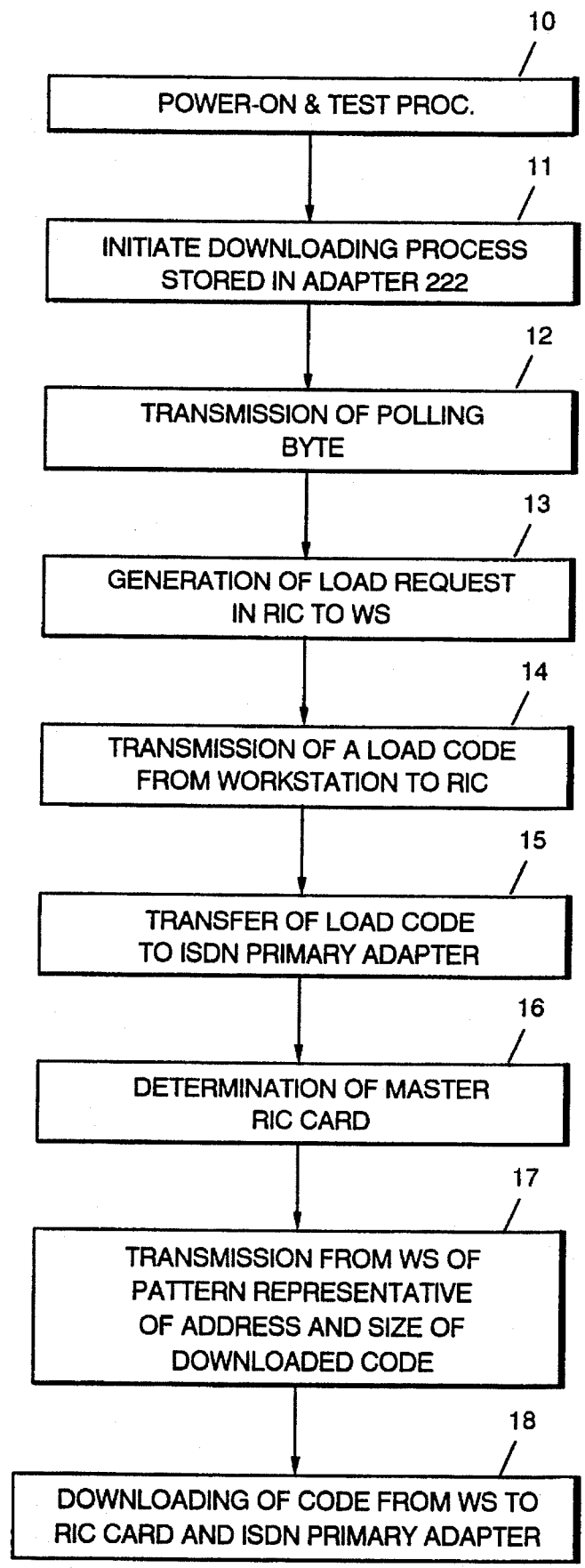
FIG. 6 illustrates the different steps performed during the initialization process.

The procedure first starts by an initialization process as illustrated in FIG. 6. The power-on reset of the machine is immediately followed by a general test procedure during which every card performs the testing of all the components as indicated by step 10. Then in step 11, the processor 100 in ISDN primary adapter 222 executes a program which is stored within the PROM storage 300. To achieve this, the Program Store ENable (PSEN) control signal which is generated by processor 100 is directly transmitted to the PROM RD output lead of control logic 330 in order to fetch the initial operational code. Therefore, after the test procedures, the PROM storage 300 delivers the program instructions to processor 100 so that the latter executes the technical steps of downloading the operational code which is stored within the main storage of the Personal System/2 500 and which will be used for the transmission of the data.

Next in step 12, the processor 100 located in the coupler of the ISDN primary adapter 222 performs a polling procedure to determine the number and the position of the RIC Portmaster cards which are likely to be connected. This is achieved by setting of the programmable input/output control bits (reference P1.0 and P1.1 in the FIG. 4), which are transmitted to the SELA and SELB selection input leads of demultiplexor 110 and also to the SELA and SELB input leads of multiplexor 130. According to the value of the two programmable input/output bits, the multiplexor 130 provides at its output lead the data which is received from the TXD output lead 64 of one among the four RIC Portmaster cards.

Similarly, according to the value of the two programmable input/output bits, the demultiplexor 110 transmits the data coming from the TXD output lead 64 of processor 100 to the RxD serial lead 63, 73, 74 or 75 of one among the four CIB daughter cards 170, 180, 190 and 200.

Thus, processor 100 can successively transmit and receive data with each of the four RIC Portmaster cards. During these successive exchanges of data, processor 100 transmits a polling byte which results in an acknowledgment when an RIC adapter actually exists in the slot.

The first RIC Portmaster card is tested with the byte 'C1' (in hexadecimal); the second is tested with 'C2', the third with 'C3' and the fourth with 'C4'. When a RIC Portmaster card receives such a polling byte, processor 140 generates an interrupt signal which appears at one programmable input/output bit lead 65 being P.3.4 in the preferred embodiment of the invention, and which is transmitted through the MCA bus to one INT input lead of processor 260. Processor 140 also generates a determined pattern, being a LOAD REQUEST pattern 'B0' (in hexadecimal) which is transmitted to the I0–I7 input bus of register 150. Then, the considered RIC Portmaster card sends back to processor 100 an acknowledgment byte 'CF' (in hexadecimal).

When processor 260 receives the above mentioned interrupt signal, it performs a READ operation of the register 150 of the RIC Portmaster card which has generated the interrupt signal. This is achieved by means of the generation of an appropriate address on its address bus, the latter being decoded by decoder 176, thus resulting in the loading of register 150 with the pattern which was just generated by processor 140. The latter pattern is thus transmitted to processor 260 by means of D0–D7 data bus 261, which is made aware that this RIC Portmaster card is available for the downloading of the operational code first in the RAM storage which is internal in the processor 140 and then inside the RAM storage 320.

On the occurrence of a LOAD REQUEST from one of the RIC Portmaster cards, main processor 260 sends the latter a LOAD CODE pattern, as indicated by step 14, the latter code being '80' (in hexadecimal) in the preferred embodiment of the invention. This is achieved by the generation of an appropriate address which is transmitted and decoded by decoder 176, and results in a validation of the LOAD input lead of register 160.

The validation signal is also used as an interrupt signal which is transmitted to the INT0 lead of processor 140. On the occurrence of the latter interrupt signal, processor 140 performs a READ operation through its programmable P4 I/O port of the contents of register 160. Then, processor 140 transmits the LOAD CODE pattern via its TXD serial bus to the corresponding input lead of multiplexor 130, as indicated by step 15, and processor 140 proceeds to a state where it waits for an acknowledgement byte (hexadecimal code 'FF' is used in the preferred embodiment) from the RXD serial bus connected to demultiplexor 110. Since processor 100 continuously polls the four input leads of multiplexor 130, processor 100 will be made aware of the LOAD CODE pattern which is serially transmitted through one input lead of multiplexer 130. On the detection of the latter LOAD CODE, processor 100 generates the acknowledgement 'FF' signal which is sent back to processor 140 via the demultiplexor 110 and the serial RXD bus.

From this instant, processor 100 recognizes the RIC Portmaster card that has generated the LOAD CODE pattern as being the master card, as indicated by step 16, and this RIC Portmaster card will be used for downloading the operational codes in the cards and also for the handling of the D-channel of the primary TDM frame. However, it should be noticed that the polling procedure which is performed by processor 100 is maintained so that the latter becomes aware of any incident which might occur in another of the RIC Portmaster cards which are plugged into the machine.

Then, in step 17, processor 260 transmits to processor 100 via the above master RIC Portmaster card a set of two bytes which are representative of the length of the whole code which will be loaded inside the RAM storage 320. It should be noticed that, in order to improve the security of the transmission, each byte which is transmitted from processor 260 to processor 140, and similarly from processor 140 to processor 100, is systematically followed by the acknowledgement byte 'FF' (in hexadecimal). Therefore, the simultaneous exchange of the control information between processor 260 and processor 100 (via processor 140) and the continuous polling of the other RIC Portmaster cards can be achieved.

When the two bytes representative of the length of the operational code which will be downloaded have been transmitted, and acknowledged by processor 100, the main processor 260, which is located within the Personal System/2 500, starts that transmission. The operational code is then transmitted byte per byte, each byte being acknowledged to processor 100 via the TXD serial bus of processor 140 and multiplexor 130, as indicated by step 18.

The operational code also includes a checksum which is computed by the processor 260 prior to the transmission of the bytes, and which is also computed by processor 140 and 100 after the reception of the bytes. If the checking of the latter checksum reveals the existence of an error which has occurred during the exchange of control data between the three processors 100, 140 and 260, the processor which has detected the error sends to the processor from which it has received the operational code, an ERROR CODE which is 'FF', and in the reverse case a final acknowledge code being 'F0' (in hexadecimal) is sent. The operational code which has been received, and acknowledged by processor 100, appears on data bus D0–D7 of processor 100, and is then stored into the RAM storage 320.

When the entire operational code has been stored in RAM storage 320 by means of the initial operating code controlling the first steps of the procedure, processor 100 resets its programmable output control bit P1.3 so that control logic 330 disables its PROM RD output lead and conversely enables the RAM RD output lead with the PSEN control signal generated by processor 100. Therefore, the latter control signal is directly transmitted to the RD input lead of RAM storage 320. What results is that the processor 100 is under control of the operational code which was just transmitted from the main storage of processor 260 and stored in the RAM of the coupler of the ISDN primary adapter 222.

From this instant, the coupler, in association with the four RIC Portmaster cards 200, 220, 230 and 240, becomes capable of handling the ISDN data transmission with the appropriate operational code which was loaded into the RAM storage of the coupler. This results in a significant advantage since it gives the possibility of downloading the operational code from the main storage of the Personal System/2 into the RAM of the coupler of the ISDN primary adapter 222, the latter not being fitted with diskette facilities or any hard disk device, contrary to the Personal System/2 which has such capabilities. This permits the update or the maintenance of the machine, and is substantially desirable in view of the continuous evolution of the different standards existing in the telecommunication field.

The operational phase starts first by the initialization of the ACFA module 630, particularly by setting the appropriate operating mode. Such an initialization of the ACFA is well known to the skilled artisan and is largely addressed by the technical manuals which are available. Similarly, processor 140 on the CIB daughter card 170 performs an initialization of the four HSCX modules 640, 650, 660 and 670 which are located on the card. Each processor on the other RIC Portmaster daughter cards 180, 190 and 200, which corresponds to processor 140 located on the daughter card 170, performs a similar initialization procedure.

This is achieved by the generation of appropriate addresses on the address bus of processor 140, which addresses are decoded by decoder 680 so as to generate one unique chip select control signal which is transmitted to one among the four HSCX modules. This results in the loading of the register in the latter HSCX module with the setting parameters which are also generated by processor 340 on data bus D0–D7.

The ISDN transmission and reception of frames can then be started. The SDLC frames which are to be transmitted on the primary interface are generated at the level of the MCA bus 261. In the preferred embodiment of the invention the succession of the bytes of the SDLC frame is generated by well known direct memory access means which are located inside the Personal System/2 in order to partially offload the computing resources of the main processor 260. Since the main processor 260 also generates an appropriate address on the address bus, and particularly on A18-A19-A20 bits of the address bus, decoder 176 activates the output Q0 lead which signal is transmitted to the LD input of register 160 and INT0 interrupt lead of processor 140. Therefore, the current byte of the considered SDLC frame is received by processor 140 via register 160 through its P4 port. This byte is processed by processor 140 under the control of the appropriate routine called by the above interrupt signal generated at the Q0 output lead of decoder 176. Then, processor 140 generates the current byte on its D0–D7 data bus in order to transmit the byte to the HSCX module which will handle the corresponding SDLC frame.

It should be noticed that the allocation of one ISDN slot, or even numerous different ISDN slots to one determined SDLC frame will be allowed by the initialization of the different HSCX modules located in the same card in accordance with the initialization general program which runs in the processor 260. This allocation of numerous ISDN slots, each ISDN slot offering a speed of 64 kbps to one determined SDLC frame, permits definition of the speed at which the SDLC frame will be transmitted through the ISDN network.

The SDLC frame which is received by the set of four HSCX modules, each HSCX module having the capability of handling two distinctive ISDN slots (the set of four RIC Portmaster cards 210, 220, 230 and 240 handling the 30B+D primary ISDN communication), is serialized on the time division multiplex serial data bus Tx which is connected to the RX input lead 62 of the ACFA module 630 located in the coupler of the ISDN primary adapter 222. The SDLC frame is then transmitted to the ISDN primary NT via the PRACT module 610 and the line transformer 600.

Conversely, the TDM serial data bus TX of ACFA module 630 transmits the digital data to the RX input lead of all the HSCX modules which are located on the daughter cards of the four RIC Portmaster cards. In accordance with the initialization parameters which were loaded with the HSCX modules, and defined by processor 260, the current ISDN slot of the TDM frame is stored and processed by one among the 16 HSCX modules which are used for handling the ISDN primary communication. It should be noticed that each HSCX module contains some First-In-First-Out storage means which, when full, results in the generation of an interrupt control signal to processor 100. This causes the latter to unload the considered FIFO storage inside the HSCX, and transmit it to the input bus of register 150, along with an interrupt signal which is transmitted to the INT0 input lead of processor 260. Consequently, the latter performs the addressing of this register 150 by means of an appropriate address generated on address bus A18-A19-A20 decoded by decoder 176 as described previously. Thus, the contents of the FIFO storage is transmitted to the main storage associated with the main processor 260 in which the whole SDLC frame is progressively reassembled.

Below are described a set of commands, in addition to the already mentioned LOAD PROGRAM CODE command, which the main processor 260 is likely to transmit to processor 100 via processor 140 and on the backward channel consisting of the RX/TX serial data bus of processor 140 and the set of multiplexor 130 and demultiplexor 110.

A first additional command which can be transmitted by main processor 260 to processor 100 is a SET LOCAL LOOP command, coded '40' then followed by '03' (in hexadecimal), which results in processor 100 reinitializing ACFA module 630 in such a way that the TDM data channel received at the RX serial input is looped back to the TX output lead of ACFA 630. This particularly allows the testing of some internal parts of the machine. The command '40' '02' is used for resetting the local loop.

Similarly, when processor 100 receives the two bytes '40' and '07' from processor 260 via the backward channel, processor 100 interprets the latter as a REMOTE LOOP command, resulting in PRACT module 610 being disconnected from the line from the Personal System/2 and generating a loop inside the PRACT between the output leads of the two transmit and receive line transformers. The two bytes '40' and '06' cause the reset of the remote loop.

Additionally, when processor 100 receives byte 'D0' through the backward channel, corresponding to an ACTIVATE LINK command, the processor 100 transmits a control signal to ACFA module 630 so that the latter activates the ISDN slot number 0 which is the slot being managed by the ACFA module. The reverse operation is carried out by means of a DEACTIVATE LINK command (code 'E0' is used in the preferred embodiment of the invention).

As mentioned previously, the data transmission is simultaneously performed with a constant polling of the four RIC Portmaster cards which are possibly installed inside the machine. More precisely, every 250 milliseconds, processor 100 sends to processor 140 via its RXD serial bus (and demultiplexer 110) a so-called NORMAL POLLING byte 'C0', which results in the call of an appropriate interrupt routine. That routine interrupt generates the transmission of an acknowledgement byte, 'CF' in hexadecimal, to processor 100, thus indicating to the latter that no problem nor incident has occurred in the considered card. In the case where the latter acknowledgement byte is not received by processor 100, the latter concludes there is the possible occurrence of an incident. If successive NORMAL POLLING bytes still remain without any acknowledgement from one processor 140, then the latter transmits an initial program load (IPL) request to the main processor 260 via one of the remaining RIC Portmaster cards being installed within the machine. Consequently, main processor 260 proceeds to a new initial program load procedure which will result in a new ISDN data transmission by means of the cards which are still operational.

What we claim is:

1. A method for initializing a set of at least two ISDN adapter cards (210–240) installed within a workstation including a main processor and a primary adapter apparatus (222) for allowing the connection of said ISDN adapter cards (210–240) to an ISDN primary gateway, each of said ISDN adapter cards including a means (640–670) for handling at least one B-channel, a first processing means (140) associated with a first memory storage, said primary adapter apparatus comprising a second processing means (100) associated with a second memory storage, said method comprising the steps of:

performing a polling procedure in said primary adapter apparatus by the transmission of a specific polling pattern to each of said ISDN adapter cards, in response to the reception of said polling pattern in one of said ISDN adapter cards, transmitting a first pattern to said main processor located in said workstation for requesting the loading of said second memory storage with operational code transferred from said workstation to said one ISDN adapter card (210) and said primary adapter apparatus (222), in response to said first pattern being received by said main processor, transmitting a second pattern to said primary adapter apparatus (222) via said one ISDN adapter card (210) that transmitted said first pattern, so that both the main processor and second processing means recognize said one ISDN adapter card as a master ISDN adapter card which will be used for the transmission of control information on a D-channel, and transferring the operational code stored within said workstation (500) into the second memory storage located in said primary adapter apparatus via said master ISDN adapter card.

2. The method according to claim 1 further comprising the step of transferring from said workstation to said primary adapter apparatus via said master ISDN adapter card, prior to the loading of operational code in said primary adapter apparatus, a pattern representative of the size and the address where said operational code has to be stored within the second memory storage in said primary adapter apparatus.

3. The method according to claim 2 further comprising the step of transferring said operational code, byte-by-byte, from said main processor (260) to said second processing means (100) via said master ISDN adapter card (210), with each byte of code transferred followed by an acknowledgment pattern which is respectively transmitted from said second processing means (100) in said primary adapter apparatus (222) to said master ISDN adapter card, and from said master ISDN adapter card to said main processor.

4. The method according to any one of the preceding claims 1–3 wherein said polling procedure is repeatedly performed in order to determine, during the loading of the operational code, the occurrence of any incident happening in one of said ISDN adapter cards (210–240) installed in the machine.

5. The method according to any one of the preceding claims 1–3 further comprising the step of transferring, in addition to said operational code, a checksum to said primary adapter apparatus which is computed by said main processor (260) in said workstation and checked by said second processing means in said primary adapter apparatus (222).

6. An ISDN adapter card installed within a workstation comprising a main processing means (260) for the connection of said workstation to an ISDN primary adapter (222) allowing the connection to an ISDN primary gateway of an ISDN network, said adapter card comprising:

means (640–670) for handling at least one of 30 B-channels contained within an ISDN primary frame, first processing means (140) associated with a memory storage for controlling said handling means (640–670), said first processing means having a serial data bus, means (63, 64) for connecting said serial data bus of said first processing means to a second processing means of said ISDN primary adapter (222), means for detecting a polling pattern received from said ISDN primary adapter (222), means, operative in response to detection of said polling pattern, for transmitting a second pattern to said main processing means (260) in said workstation (500), means for monitoring the reception of a third pattern generated by said main processing means (260), means, operative in response to reception of said third pattern, for transmitting a fourth pattern to said second processing means (100) located in said ISDN primary adapter, the transmitting of said fourth pattern resulting in both the main processing means (260) and second processing means (100) acknowledging that said ISDN adapter card is a master ISDN adapter card which will be used for the management of a D-channel of the ISDN frame.

7. The ISDN adapter card according to claim 6 further comprising means for allowing the downloading of operational code from said workstation to said ISDN primary adapter via said serial data bus.

8. An apparatus for allowing the connection of a workstation (500) to an ISDN primary gateway of an ISDN network, said workstation comprising a main processing means (260) and having a plurality of ISDN adapter cards, each ISDN adapter card capable of handling at least one B-Channel or one D-channel of an ISDN primary 30B+D frame and including a first processing means (140) with associated storage, said apparatus comprising:

second processing means (100) associated with a memory storage (300, 320), said second processing means having a serial data bus for exchanging control signals with said first processing means (140) of each ISDN adapter card, multiplexing (130) and demultiplexing means (110) for respectively multiplexing and demultiplexing the control signals which are transmitted between said second processing means (100) and each ISDN adapter card (210–240) installed within said workstation (500), means for sending a polling pattern to each ISDN adapter card (210–240), said polling pattern inducing the transmission of a corresponding second pattern to said main processing means (260) by one of said plurality of ISDN adapter cards (210–240), means for monitoring the reception of a fourth pattern generated by said first processing means in said one ISDN adapter card following the reception by said one ISDN adapter card of a third pattern which was generated by said main processing means (260), the reception of said fourth pattern resulting in both the main processing means (260) in said workstation and said second processing means (100) in said apparatus acknowledging that said one ISDN adapter card is a master ISDN adapter card which will be used for the management of the D-channel of the ISDN frame.

9. The apparatus according to claim 8 further comprising means for transferring operational code from said workstation into said memory storage (320) associated with said second processing means (100) through said master ISDN adapter card (210).

10. The apparatus according to claim 9 further comprising means (630, 100) for receiving via said serial data bus a SET LOCAL LOOP command generated by said main processing means (260) in said workstation and transmitted through said master ISDN adapter card, said SET LOCAL LOOP command enabling said second processing means to control the creation of an internal local loop resulting in the ISDN primary frame which is received from each ISDN adapter card being returned to said each ISDN adapter card without being transmitted to the ISDN network.

11. The apparatus according to claim 9 further comprising means (100, 610) for receiving via said serial data bus a REMOTE LOOP command generated by said main processing means (260) in said workstation and transmitted through said master ISDN adapter card (210), said REMOTE LOOP command resulting in a disconnection of the workstation from the ISDN primary gateway and the creation of an internal loop resulting in the ISDN primary frames which are received from the ISDN network being transmitted back to said ISDN network.

* * * * *